US011858751B2

(12) United States Patent
Hoellriegl et al.

(10) Patent No.: US 11,858,751 B2
(45) Date of Patent: Jan. 2, 2024

(54) APPARATUS FOR TREATING CONTAINERS WITH LINEAR DRIVE, AS WELL AS LINEAR DRIVE

(71) Applicant: KRONES AG, Neutraubling (DE)

(72) Inventors: Thomas Hoellriegl, Teublitz (DE); Nina Habenschaden, Regensburg (DE); Harald Effenberger, Schierling (DE)

(73) Assignee: KRONES AG, Neutraubling (DE)

( * ) Notice: Subject to any disclaimer, the term of this patent is extended or adjusted under 35 U.S.C. 154(b) by 40 days.

(21) Appl. No.: 17/667,607

(22) Filed: Feb. 9, 2022

(65) Prior Publication Data
US 2022/0258984 A1 Aug. 18, 2022

(30) Foreign Application Priority Data
Feb. 15, 2021 (DE) ...................... 10 2021 103 479.5

(51) Int. Cl.
F16C 29/04 (2006.01)
F16C 19/08 (2006.01)
B65G 39/02 (2006.01)
B65G 39/18 (2006.01)

(52) U.S. Cl.
CPC ........... B65G 39/025 (2013.01); B65G 39/18 (2013.01); B65G 2201/0235 (2013.01)

(58) Field of Classification Search
CPC ....... B65G 39/025; B65G 39/18; F16C 19/08; F16C 29/04
USPC .................................. 193/37; 384/49, 50, 51
See application file for complete search history.

(56) References Cited

U.S. PATENT DOCUMENTS

| 5,213,419 | A | * | 5/1993 | Geka | ....................... | F16C 29/04 |
| | | | | | | 384/49 |
| 5,322,370 | A | * | 6/1994 | Gallone | ................... | F16C 33/62 |
| | | | | | | 384/49 |
| 5,431,498 | A | * | 7/1995 | Lyon | ....................... | F16C 33/60 |
| | | | | | | 384/45 |
| 6,561,056 | B2 | * | 5/2003 | Maffeis | ............... | F16C 29/0671 |
| | | | | | | 384/43 |
| 7,344,310 | B2 | * | 3/2008 | Mine | ....................... | F16C 29/04 |
| | | | | | | 384/49 |
| 7,465,092 | B2 | * | 12/2008 | Hsu | ..................... | F16C 33/3825 |
| | | | | | | 384/54 |

(Continued)

FOREIGN PATENT DOCUMENTS

DE         33 27 741 A1    5/1984
DE   10 2011 101 255 A1   11/2012

(Continued)

Primary Examiner — Douglas A Hess
(74) Attorney, Agent, or Firm — Schmeiser, Olsen & Watts, LLP

(57) ABSTRACT

Provided is an apparatus for treating containers, having a treatment device for treating the containers, and a carrier which is arranged such that it can move linearly with respect to a holder, wherein a plurality of rolling elements being arranged between the carrier and the holder and guiding the movement of the treatment device, wherein these rolling elements at least temporarily contact both a running surface of the carrier and a running surface of the holder, wherein the rolling elements are arranged in a rolling elements cage and move in the direction of movement, wherein this rolling element cage extends in the direction of movement and has a greater length than the holder.

10 Claims, 1 Drawing Sheet

(56) References Cited

U.S. PATENT DOCUMENTS

| | | | | |
|---|---|---|---|---|
| 8,523,443 B2* | 9/2013 | Traiser | ................ | F16C 29/04 |
| | | | | 384/54 |
| 8,764,294 B2* | 7/2014 | Winkler | ............. | F16C 29/0654 |
| | | | | 384/49 |
| 9,797,450 B1* | 10/2017 | Huang | ............... | F16C 33/6614 |
| 9,969,117 B2* | 5/2018 | Hoellriegl | ......... | B29C 49/42069 |
| 10,018,226 B2* | 7/2018 | Ishihara | ............. | F16C 29/0607 |
| 10,151,654 B2* | 12/2018 | Bluemm | ............ | F16C 29/0645 |
| 10,557,504 B1* | 2/2020 | Jiang | ................ | F16C 19/522 |
| 10,774,872 B2* | 9/2020 | Matsumoto | ........... | F16C 33/664 |
| 10,816,037 B2* | 10/2020 | Dei | ........................ | F16C 29/08 |
| 11,603,883 B1* | 3/2023 | Lin | ................... | F16C 29/0609 |

FOREIGN PATENT DOCUMENTS

| | | |
|---|---|---|
| DE | 10 2013 218337 A1 | 3/2015 |
| EP | 1 760 341 A2 | 3/2007 |
| WO | 2009/027344 A1 | 3/2009 |

* cited by examiner

APPARATUS FOR TREATING CONTAINERS WITH LINEAR DRIVE, AS WELL AS LINEAR DRIVE

CROSS-REFERENCE TO RELATED APPLICATION

This application claims priority to German Application No. 10 2021 103 479.5, having a filing date of Feb. 15, 2021, the entire contents of which are hereby incorporated by reference.

FIELD OF TECHNOLOGY

The following relates to an apparatus for treating containers. Many such devices have been known in the conventional art for a long time. These can be, for example, filling devices, blow moulding devices or also transport devices for containers. The following is described with reference to transport devices, such as transport star wheels for transporting containers. However, it is noted that the following can also be applied to other container handling devices.

BACKGROUND

In such apparatus for handling containers, it is sometimes necessary to perform linear movements with a high speed and/or a high acceleration. This is the case, for example, with so-called pitch distribution star wheels, which are used to change the distance between containers that are transported one after the other. To achieve these movements, linear guides are partially used in the state of the art, which can, for example, move a gripping element along a straight direction.

In the state of the art, there are a plurality of types of linear guides, and so-called profile rails from different manufacturers. These are characterised by high load capacity, high precision and high rigidity. However, many of these linear guides reach their limits at very high speeds and accelerations. For example, guide carriages are known from the conventional art which have a ball mechanism or cylindrical rollers as well as a return channel and deflection heads.

The state of the art does not yet include any guides that work satisfactorily even at extremely high transport or movement speeds. For example, there are no standard linear guides in the state of the art that can permanently reach or withstand the required extremely high path speeds.

Most linear guides have internal deflection channels for the rolling elements, such as balls or cylindrical rollers, which have too much friction or resistance. Due to the high friction and the resulting pressure of the ball chain, the deflections are usually not resistant to continuous stress or maximum performance.

SUMMARY

An aspect relates to providing a linear guide which can also cope with high or very high operating speeds and/or accelerations.

An apparatus according to embodiments of the invention for treating containers comprises a treatment device for treating the containers and a carrier which is arranged to be linearly movable with respect to a holder, wherein a plurality of rolling elements are arranged between the carrier and the holder, which rolling elements guide the movement of the treatment device and/or the movement of the carrier with respect to the holder, wherein these rolling elements at least temporarily contact both a running surface of the carrier and a running surface of the holder. The holder serves for holding the carrier.

According to embodiments of the invention, the rolling elements are arranged in a rolling element cage and move in the (linear and/or rectilinear) direction of movement, wherein this rolling element cage extends in the direction of movement and has a greater length (in the direction of movement) than the holder (or than the running surfaces of the holder) and/or that the rolling element cage is designed in such a way that some of the rolling elements also temporarily lie or are arranged outside the holder. This means that some of the rolling elements are not guided by the running surface of the holder.

A linear movement is understood to mean that the relative movement between the carrier and the holder or the movement of the carrier with respect to the holder is linear and/or rectilinear. The overall movement of the treatment device in space does not necessarily have to be linear, as it can be composed of this linear movement and the movement of a carrier.

In an embodiment, the carrier is rod-like and extends with its longitudinal direction in particular in its direction of movement.

In an embodiment, the treatment device is arranged on the carrier (and in particular is not arranged to be linearly movable). It is possible that the treatment device is fixed to the carrier, for example to an end section of the carrier. However, it is also conceivable that the treatment device is pivotably arranged on the carrier. In an embodiment, the treatment device is a gripping device for gripping the containers.

In an embodiment, the carrier (together with the holder (holding the carrier)) is arranged pivotably with respect to a pivot axis. In an embodiment, the treatment device is pivotably arranged on the carrier in the same pivot plane in which the carrier itself is pivotably arranged.

In an embodiment, a guide roller is provided which effects the (linear or rectilinear) movement of the carrier relative to the holder. In an embodiment, a further guide roller is provided which causes the pivot movement of the carrier with respect to a predetermined pivot axis. In an embodiment, this pivoting movement takes place with respect to a main carrier on which the entire device, i.e., at least the holder and the carrier, is arranged.

In an embodiment, the carrier moves in the linear direction relative to the holder and/or the holder is arranged stationary in this linear direction (in particular arranged stationary in this direction relative to a main carrier). However, it would also be conceivable that the carrier is arranged stationary, and the holder moves in the linear direction. In this case, the treatment device is arranged on the holder. In general, the treatment device is arranged on the linear moving element.

In an embodiment, the rolling elements are arranged in at least one and in several rows. In an embodiment, each of these rows extends exclusively in a straight line, i.e., there is no deflection of the rolling elements.

In an embodiment, all the rolling elements of a row of rolling elements simultaneously contact a running surface formed on the carrier, wherein this running surface extending exclusively in a straight line. In an embodiment, a row of rolling elements arranged one behind the other is also longer than the holder.

In an embodiment, both the carrier and the rolling element cage move relative to the holder in said linear direction.

However, the rolling element cage moves relative to the carrier (or the carrier relative to the rolling element cage) at a lower speed than the carrier moves relative to the holder and the carrier moves relative to the rolling element cage at half the speed at which the carrier moves relative to the holder.

In an embodiment, all rolling elements always move in the same direction of movement relative to the carrier in which the carrier moves relative to the holder. For example, if the carrier moves in a first direction of movement relative to the holder, all rolling elements also move in this direction of movement.

In an embodiment, at least one of the running surfaces on which the rolling elements roll is hardened. In an embodiment, both the running surfaces of the carrier and the running surfaces of the holder are hardened.

In an embodiment, the apparatus and/or the carrier and/or the holder and/or the rolling element cage is provided with an adherent and/or corrosion-inhibiting lubrication. In this way, very low-friction and noiseless linear systems can be realised.

In an embodiment, a lubrication device is provided on at least one end side of the carrier and/or the holder.

This lubrication device releases a lubricant onto the rolling elements and in particular balls as they move past. The lubrication device has a reservoir that can be refilled with oil, grease or other common lubricants. The lubrication device can especially be screwed on tightly or can also be plugged on. The lubrication can also be embedded directly in the rolling element cage.

In an embodiment, said carrier has no deflections (for the rolling elements) and no return channels.

In an embodiment, some rolling elements are therefore at least temporarily located outside the holder and/or outside the running surfaces of the holder in the direction of movement. This may occur in particular in the extreme positions of the carrier relative to the holder, in which those rolling elements which are arranged at the opposite end of the rolling element cage are arranged outside the holder. It is also possible that, at least at times, rolling elements protrude beyond the holder in both opposite directions of movement.

It is pointed out that this holder can also be constructed in several parts. In this case, this holder can have a carrier which is in direct contact with the rolling element cage or the rolling elements (and which also has the running surfaces for the rolling elements) and on this carrier, in turn, further elements can be attached which, for example, allow the carrier to rotate, such as a pivot bearing.

In an embodiment, the holder is pivotally mounted with respect to a pivot axis which is perpendicular to the direction of movement of the carrier with respect to the holder.

In a further embodiment, for example, the carrier can also be designed as the rotor of a linear motor and the holder as the stator of this linear motor.

In an embodiment, the carrier and the holder are modified in such a way that it is possible for the rolling element cage to pass through the holder.

In an embodiment, the rolling element cage is adapted to hold the rolling elements independently and in particular to hold them independently on the carrier. This has the effect that the rolling elements are held on the carrier even in the position in which they are not in contact with the holder. For example, the rolling element cage can be designed in such a way that it itself holds independently on the carrier, for example by a clamping effect. The rolling elements may in turn be arranged in recesses and/or pockets which are designed in such a way that the rolling elements cannot fall out of them. These recesses or pockets can be designed in such a way that the rolling elements cannot pass through them to the outside (as seen from the carrier).

In an embodiment, the rolling element cage is formed in one piece. This rolling element cage can be an element manufactured in a predetermined manner, for example a milled, drilled, caulked or injection-moulded element. In an embodiment, the rolling element cage is an element manufactured using a 3D printing process.

In an embodiment, the rolling elements are balls. However, cylinders can also be used as rolling elements, frusto-conical rolling elements and the like.

In an embodiment, the carrier is designed as a profile rail with at least one and at least two recesses extending in the direction of movement. In an embodiment, these recesses have a constant cross-section in the direction of movement.

In an embodiment, at least one of the running surfaces for the rolling elements is also formed in or partially in this recess. In an embodiment, at least one running surface of the carrier is formed at least partially and completely outside the recess. In an embodiment, the recesses are formed on opposite sides of the carrier. Thus, the carrier extends in a longitudinal direction, which in particular also corresponds to the direction of movement, and a width direction and/or a thickness direction perpendicular thereto. In an embodiment, the recesses are formed in such a way that they extend in the longitudinal direction and have a constant profile in the width and thickness direction.

In an embodiment, at least some of the rolling elements run at least temporarily inside the recesses. In an embodiment, some of the rolling elements always run outside the recesses.

Thus, the new type of linear guide described here is based on profile rail guide systems, which, however, do not require deflections and return channels.

As mentioned above, a specially designed rolling element cage is used for this purpose, which holds the rolling elements or balls themselves and carries them along on the carrier or profile rail during movement. In the process, the rolling elements or balls are not only deflected, but move longitudinally to the direction of movement and thus move out of the guide (in particular the guide of the treatment device) at at least one end and at both ends.

In an embodiment, the rolling element cage has a plurality of pockets in which the rolling elements are held in order to reintroduce them into the guide surface (of the treatment device) when they are extended or retracted into the holder. In an embodiment, these pockets are designed in such a way that the rolling elements cannot exit the pockets to the outside (starting from the carrier). For example, the pockets can have openings that only allow passage of part of the surface of the balls, but not passage of the cross-section of the balls.

In an embodiment, the rolling element cage is designed in such a way that it can hold all rolling elements on the carrier independently, i.e., without interacting with the holder.

The rolling element cage can be made of different materials, for example plastics or metallic materials. In an embodiment, the rolling elements are arranged in two, four or six rows. This respective arrangement is thereby adapted in particular to the mechanical conditions and/or the expected loads on the rolling elements. For example, it would be possible for two rows of rolling elements to be arranged on one side of the carrier and two further rows on the opposite side.

In an embodiment, the rolling elements are arranged in an X or an O arrangement. These arrangements are also selected according to the mechanical load. Whether there is an X or an O arrangement is determined by the arrangement of the respective guide surfaces for the balls. For example, pressure lines can be drawn which indicate an X or an O. For example, it would be possible for two angular contact ball bearings to be arranged in mirror image. The position of the pressure lines, i.e., the force flow lines, then indicates whether it is an X or an O arrangement.

The arrangement described here allows very high path speeds and/or path accelerations of the treatment device. For example, these accelerations can be greater than 50 m/s$^2$, greater than 100 m/s$^2$ and greater than 150 m/s$^2$. Furthermore, accelerations of up to 300 m/s$^2$ are possible. However, accelerations greater than 300 m/s$^2$ are also conceivable. In this way, a high degree of ease of movement of the guide is achieved.

Furthermore, embodiments of the invention allow a precise backlash-free or also preloaded guidance for extremely high path accelerations with a high load absorption, stiffness and with high torques. At an extreme speed of change of direction, this is also no problem, as there are no deflections and mutual ball friction. Furthermore, the guides described here offer the advantage that no so-called slipstick effect (stick-slip effect) occurs. In an embodiment, dry running or only the use of initial lubrication is also possible. In addition, fewer components with an angular design are also provided.

In an embodiment, the guide device also comprises a lubrication device which is suitable and intended to lubricate the bearing guide with a lubricant.

In an embodiment, the rolling element cage is at least 1.2 times as long in the direction of movement as the holder, at least 1.4 times as long, at least 1.5 times as long and at least 1.7 times as long. In an embodiment, the rolling element cage is at most 2.5 times as long in the direction of movement as the holder, at most 2.2 times as long, at most 2.0 times as long and at most 1.8 times as long.

In an embodiment, the rolling element cage surrounds the profile rail or the carrier at least in sections. In an embodiment, the rolling element cage has a side surface which is formed without rolling elements and which is opposite a corresponding side surface of the carrier. This side surface is a connecting surface, which connects two further side surfaces to each other, which in turn have rolling elements. This side surface can be spaced from the corresponding side surface of the carrier.

In an embodiment, the rolling element cage has a U-shaped profile. However, other profiles such as trapezoidal profiles, triangular profiles or meandering profiles could also be used.

As mentioned above, the rolling elements or balls engage behind the profile areas of the carrier. In an embodiment, the apparatus described here is an apparatus for transporting containers. In an embodiment, the apparatus has a gripping device for gripping the containers, wherein this gripping device being a component of the treatment device.

In an embodiment, the apparatus is a transport star wheel for transporting containers. In particular, the apparatus is a so-called pitch distribution star wheel, which is suitable and intended to also change a distance between the containers during a transport of the containers. In an embodiment, this apparatus has a rotatable carrier on which a plurality of treatment devices of the type described above (on a corresponding plurality of carriers) are arranged. These each have the linear guides described above. It is possible that these treatment devices and/or the carriers are also pivotably arranged on this carrier (i.e., the main carrier).

Embodiments of the invention are further directed to linear guide means for an apparatus for treating containers, comprising a carrier which is arranged linearly movable with respect to a holder, wherein between the carrier and the holder a plurality of rolling elements is arranged which guide the movement of the carrier with respect to the holder and/or the movement of a treatment devices, wherein said rolling elements at least temporarily contacting both a running surface of the carrier and a running surface of the holder.

According to embodiments of the invention, the rolling elements are arranged in a rolling element cage and move in the direction of movement and in particular exclusively in this direction of movement. This rolling element cage extends in this direction of movement and has a greater length than the holder and/or than the running surfaces of the holder. It is conceivable that the holder itself is longer than its running surfaces.

In an embodiment, the linear guide device is used to move a treatment device that treats containers. Thus, a treatment device is proposed that is used in particular for treating containers. This can be a treatment device that moves the containers themselves. However, other elements could also be moved, such as, for example, a stretching bar of a blow moulding machine which is inserted into containers, a blowing nozzle which is fed onto a plastic preform, filling heads of a filling machine or the like. Packages of containers can also be moved, for example.

Embodiments of the invention are further directed to a rolling element cage for a linear guide device of an apparatus for treating containers, comprising a first side wall which extends in a predetermined longitudinal direction and which has a plurality of recesses arranged one behind the other in this longitudinal direction for receiving spherical rolling elements, with a second side wall which extends in the predetermined longitudinal direction and which has a plurality of recesses arranged one behind the other in this longitudinal direction for receiving spherical rolling elements, and with a connecting wall (also extending in this longitudinal direction) which connects the first side wall and the second side wall to one another.

According to embodiments of the invention, the first recesses and the second recesses are dimensioned and/or designed in such a way that the rolling elements cannot pass through the side wall.

In an embodiment, the first side wall and the second side wall are substantially parallel to each other. In an embodiment, these recesses each have a (bottom) opening through which a portion of the surface of the rolling elements can pass, but not the (largest) cross-section of the rolling elements. In an embodiment, the recesses are suitable and intended for receiving spherical rolling elements.

In an embodiment, each side wall forms at least two rows of recesses for rolling elements. In an embodiment, the rolling element cage has a plurality of rolling elements and in particular spherical rolling elements. In an embodiment, these rolling elements are arranged along the longitudinal direction of the side walls.

BRIEF DESCRIPTION

Some of the embodiments will be described in detail, with references to the following Figures, wherein like designations denote like members, wherein.

DETAILED DESCRIPTION

Figure 1:
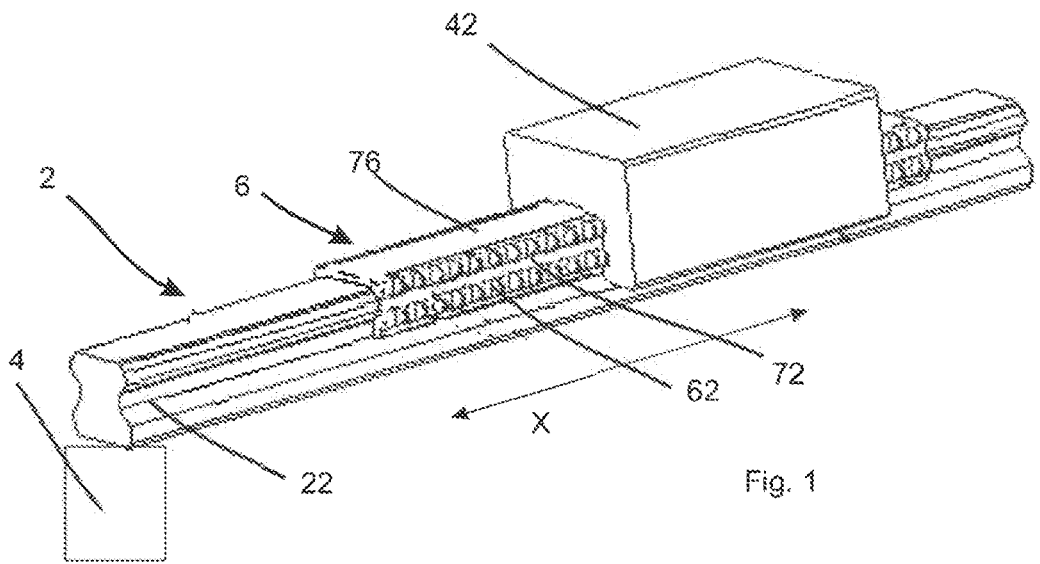
FIG. 1 shows a simplified representation of a linear guide device according to embodiments of the invention.

FIG. 1 shows a simplified representation of a linear guiding device. A carrier 2 is provided. The treatment device, designated in its entirety as 4, is movably arranged on this carrier. This is only shown schematically and can have further elements such as a container gripping device.

The carrier 2 is linearly movable in relation to a holder 42. The holder can be arranged on a main carrier (not shown) such as a transport star wheel.

It is also possible that drives (not shown) such as electric motor drives are arranged on the carrier 2 and/or the holder 42.

The (in particular rod-shaped) carrier 2 moves with respect to the holder 42 in the direction of movement X, which is rectilinear. The carrier 2 here has two recesses 22 (only one visible), which are arranged on the sides of the carrier 2 and which also extend in the direction of movement X.

The reference sign 6 indicates a rolling element cage which is arranged on the carrier 2 (movable in the direction X). This rolling element cage 6 has a connecting wall 76 and two side walls 72, 74. Two rows of rolling elements or balls 62 are arranged in each of the side walls 72, 74, which serve as bearings. The reference signs 82 and 84 refer to recesses in which the individual rolling elements or balls are arranged. The rolling elements cannot protrude completely outwards from the recesses, but as can be seen in FIG. 2, they do protrude beyond them so that they can come into contact with the running surfaces of the holder 42.

It can be seen that the lower row of balls runs in the recess 22, while the upper row of balls is arranged above the recess 22. In this way, a hold of the rolling element cage on the carrier 2 is ensured. The running surfaces for the rolling elements are also formed on the carrier 2 areas. Corresponding running surfaces are also located on the inside of the holder 42.

Figure 2:
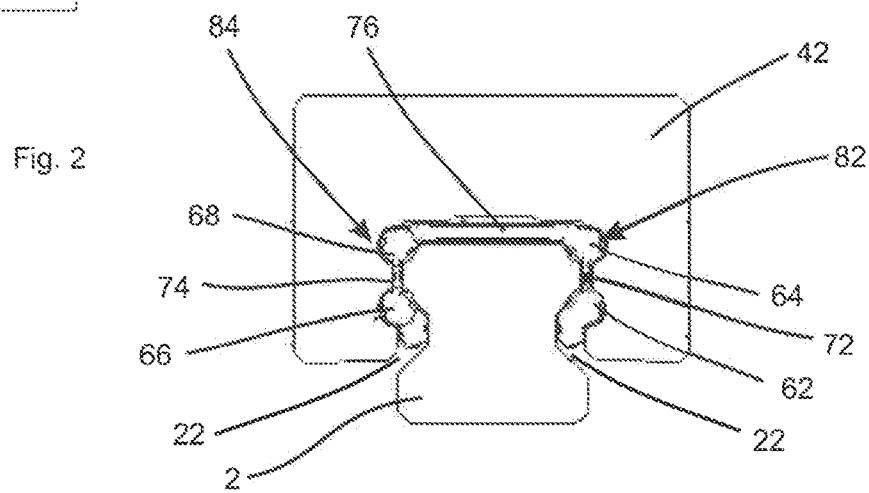
FIG. 2 shows a sectional view of the linear guide device shown in FIG. 1.

FIG. 2 shows a sectional view of the guide device shown in FIG. 1. It can be seen that here the two rows 62 and 66 of rolling elements run inside the recess 22. The two further rows 64 and 68 run above the recess 22 so that a section of the profile is accommodated between the rows of rolling elements 66 and 68 or 62 and 64.

In this way, a secure hold of the carrier on the holder 42 is made possible.

Figure 3:
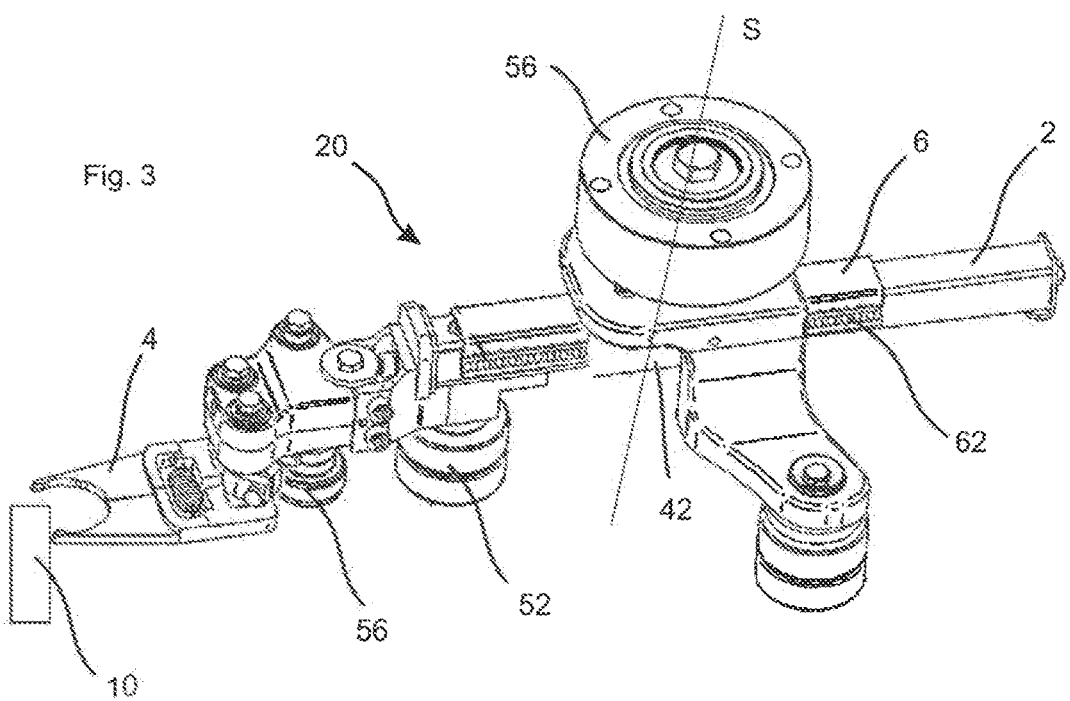
FIG. 3 shows a representation of a transport device with a linear guide device.

FIG. 3 shows an illustration of an application of embodiments of the present invention, i.e., an apparatus 1 for treating containers in the form of a pitch distribution star wheel 1, which has a carrier rotatable about an axis of rotation (not shown) on which the treatment unit 20 shown in FIG. 3 is arranged, as well as other similar treatment units.

The reference sign 4 indicates a treatment device in the form of a gripping clamp which is used to grip a container 10 (only shown schematically). This handling device 4 is pivotably arranged on the carrier 2. A guide roller 56 is provided to effect this pivoting movement.

The carrier is linearly movable with respect to the holder 42, wherein a further guide roller 52 is provided for carrying out this movement, which is arranged on the carrier 2.

The holder 42 is pivotable together with the carrier 2 with respect to a pivot axis S, wherein this pivot axis is perpendicular to the direction of movement X (cf. FIG. 1). This pivoting movement is effected by means of a pivot bearing 56 and a further guide roller. The above-mentioned guide rollers run with respect to (not shown) guide rails.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for treating containers, having a treatment device for treating the containers, and a carrier which is arranged so as to be linearly movable with respect to a holder,
wherein a plurality of rolling elements being arranged between the carrier and the holder and guiding the movement of the treatment device, wherein these rolling elements at least temporarily contact both a running surface of the carrier and a running surface of the holder,
wherein the rolling elements are arranged in a rolling element cage and move in the direction of movement, wherein this rolling element cage extends in the direction of movement and has a greater length than the holder.

2. The apparatus according to claim 1, wherein rolling elements are at least temporarily arranged outside the holder in the direction of movement.

3. The apparatus according to claim 1, wherein the rolling element cage is suitable and intended to hold the rolling elements independently on the carrier.

4. The apparatus according to claim 1, wherein the rolling elements are balls and in particular steel balls or ceramic balls.

5. The apparatus according to claim 1, wherein the carrier is designed as a profile rail with at least one and with at least two recesses extending in the direction of movement.

6. The apparatus according to claim 5, wherein at least some rolling elements extend at least temporarily within the recesses.

7. The apparatus according to claim 1, wherein the rolling elements are arranged in two rows, four rows, or six rows.

8. The apparatus according to claim 1, wherein the apparatus is a transport device for transporting containers.

9. A linear guide device for an apparatus for treating containers, having a treatment device for treating the containers, and a carrier which is arranged such that the carrier can move linearly with respect to a holder, wherein a plurality of rolling elements being arranged between the carrier and the holder, which rolling elements guide the movement of the carrier with respect to the holder, wherein these rolling elements at least temporarily contact both a running surface of the carrier and a running surface of the holder, wherein the rolling elements are arranged in a rolling element cage and move in the direction of movement, wherein this rolling element cage extends in the direction of movement and has a greater length than the holder.

10. A rolling element cage for a linear guide device of an apparatus for treating containers, having a first side wall, which extends in a predetermined longitudinal direction and which has a plurality of recesses arranged one behind the other in this longitudinal direction for receiving spherical rolling elements, having a second side wall, which extends in the predetermined longitudinal direction and which has a plurality of recesses arranged one behind the other in this longitudinal direction for receiving spherical rolling elements, and having a connecting wall which connects the first side wall and the second side wall to one another, wherein the first recesses and the second recesses are dimensioned in such a way that the rolling elements cannot pass through the side wall.

\* \* \* \* \*